United States Patent [19]

Gruenberg et al.

[11] Patent Number: 5,313,318
[45] Date of Patent: May 17, 1994

[54] INTERNAL FRAME FOR A LIQUID CRYSTAL DISPLAY NOT EXTENDING TO THE UPPER SURFACE THEREOF, LIGHT GUIDE AND CIRCUITRY ASSEMBLY

[75] Inventors: Eric I. Gruenberg, Soquel; Troy Hulick, San Jose, both of Calif.

[73] Assignee: Apple Computer, Inc., Cupertino, Calif.

[21] Appl. No.: 787,293

[22] Filed: Nov. 4, 1991

[51] Int. Cl.⁵ .................. G02F 1/1335; G02F 1/1333
[52] U.S. Cl. ...................................... 359/49; 359/48; 359/83
[58] Field of Search .............................. 359/48, 49, 83

[56] References Cited

U.S. PATENT DOCUMENTS

| | | | |
|---|---|---|---|
| 4,183,628 | 1/1980 | Laesser et al. | 359/48 |
| 5,146,354 | 9/1992 | Plesinger | 359/83 |
| 5,182,660 | 1/1993 | Tanaka | 359/83 |

*Primary Examiner*—Anita P. Gross
*Attorney, Agent, or Firm*—Mark A. Aaker

[57] ABSTRACT

This invention provides a thin, light assembly for a LCD, light guide and circuitry by using an internal frame with a central opening, above which is mounted a LCD and below which is mounted a light guide for directing light through the opening into the display. To one side of the light guide is mounted a light bulb for introducing light into the light guide. The internal frame also supports mounting of circuitry adjacent and coupled to the LCD.

11 Claims, 2 Drawing Sheets

INTERNAL FRAME FOR A LIQUID CRYSTAL DISPLAY NOT EXTENDING TO THE UPPER SURFACE THEREOF, LIGHT GUIDE AND CIRCUITRY ASSEMBLY

BACKGROUND OF THE INVENTION

This invention relates to a mechanical assembly for mounting a Liquid Crystal Display (LCD), light guide and electronic circuitry on an internal frame. This assembly provides a single package of low thickness and low weight, while retaining high strength, stiffness and support.

FIG. 1 shows a cross section view of a conventional assembly of a LCD, light guide and circuitry. A LCD 10 commonly has two sheets of glass separated by a sealed-in, liquid crystal material. The application of electrical voltages to this material changes its optical characteristics. By providing a large number of electrically conductive traces on the glass to control individual segments of this material, a display panel can be formed for the display of text and graphics.

While a LCD 10 can rely solely on ambient light falling upon it to be reflected to the viewer, additional viewing flexibility can be provided by using a "backlight" usually situated behind the LCD 10 and directing light through the LCD 10 to the viewer. A common form of backlight shown in FIG. 1 has a Cold Cathode Fluorescent (CCF) light bulb 12 mounted to one side of the LCD 10, whose light is brought underneath and directed upward through the LCD 10 by a plastic light guide 14 that conducts the light sideways and evenly diffuses the light upwards. Light guide 14 can be made of acrylic, polycarbonate or polystyrene with appropriate grooves, scoring, or dispersed material to diffuse light upward into the LCD 10.

It should be noted that a LCD 10 and light guide 14 cannot be directly mounted to each other, since the LCD glass and light guide acrylic have widely different coefficients of expansion with variation in temperature. A directly adhered LCD 10 and light guide 14 would buckle or flex with temperature changes, or would result in damage to the softer light guide material as the LCD glass resisted expansion. Conventional assemblies, such as FIG. 1, use a "wrap-around" metal frame 16 that encloses a LCD 10 against a light guide 14, separated by spacers 15. This conventional assembly allows the individual expansion and contraction of the LCD glass and plastic light guide. These conventional assemblies are quite thick, and heavy as the metal frame 16 adds a layer of metal both above and below, and has metal frame 16 surrounding the entire circumference of the assembly. It is desired to reduce the thickness and weight of these assemblies since they are frequently used in portable equipment.

There is electronic circuitry 18 associated with driving and controlling the LCD 10, and it is desirable to position this circuitry close to the LCD 10 where the large number of electrically conductive traces from LCD 10 are easily accessible. In conventional assemblies as shown in FIG. 1, this circuitry 18 is mounted on a circuitry board 19 below the light guide 14. This requires a large number of interconnections around the edge of the light guide 14 up to the LCD 10 by means of a flexible interconnect, multiconductor flat cable, or "flex-circuit" not shown in FIG. 1. This additional interconnect adds to the complexity, thickness, and cost of the assembly. Alternatively, the circuitry 18 and circuitry board 19 can be mounted at the edge of the LCD 10. This edge position requires that the circuitry 18 and circuitry board 19 be contained within the "wrap-around" metal frame 16, which further increases its size and weight.

SUMMARY OF THE INVENTION

This invention provides a LCD, light guide and circuitry assembly with an internal frame. An assembly according to this invention provides a thin, light assembly with direct connection of the LCD and its associated circuitry. An assembly according to this invention has an internal frame with a central opening above which is mounted a display and below which is mounted a light guide for directing light through the opening into the display. To one side of the light guide is mounted a light bulb for introducing light into the light guide, and to one side of the frame is mounted circuitry coupled to the display.

Compared to the conventional assembly of FIG 1, eliminating the "wrap-around" metal frame 16 reduces the thickness and weight of an assembly in accordance with this invention. Details of an internal frame and assembly in accordance with this invention are provided in the following drawings, specification, and claims.

DETAILED DESCRIPTION

Figure 2:
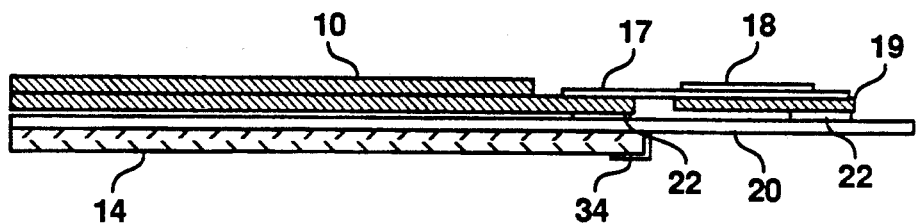
FIG. 2 shows a cross section view of an assembly for a LCD, light guide and circuitry using an internal frame in accordance with this invention.

FIG. 2 shows a cross section view of an assembly for a LCD, light guide and circuitry using an internal frame in accordance with this invention. An internal frame 20 is used, above which is mounted the LCD 10, and below which is mounted a light guide 14. To one side of LCD 10 is circuitry 18 on a circuitry board 19. Circuitry 18 is directly coupled to LCD 10 by an interconnect 17. The LCD 10 and circuitry board 19 can be mounted to internal frame 20 by gaskets 22. Light guide 14 can be loosely held to internal frame 20 by folded-under sheet metal tabs 34.

Figure 3:
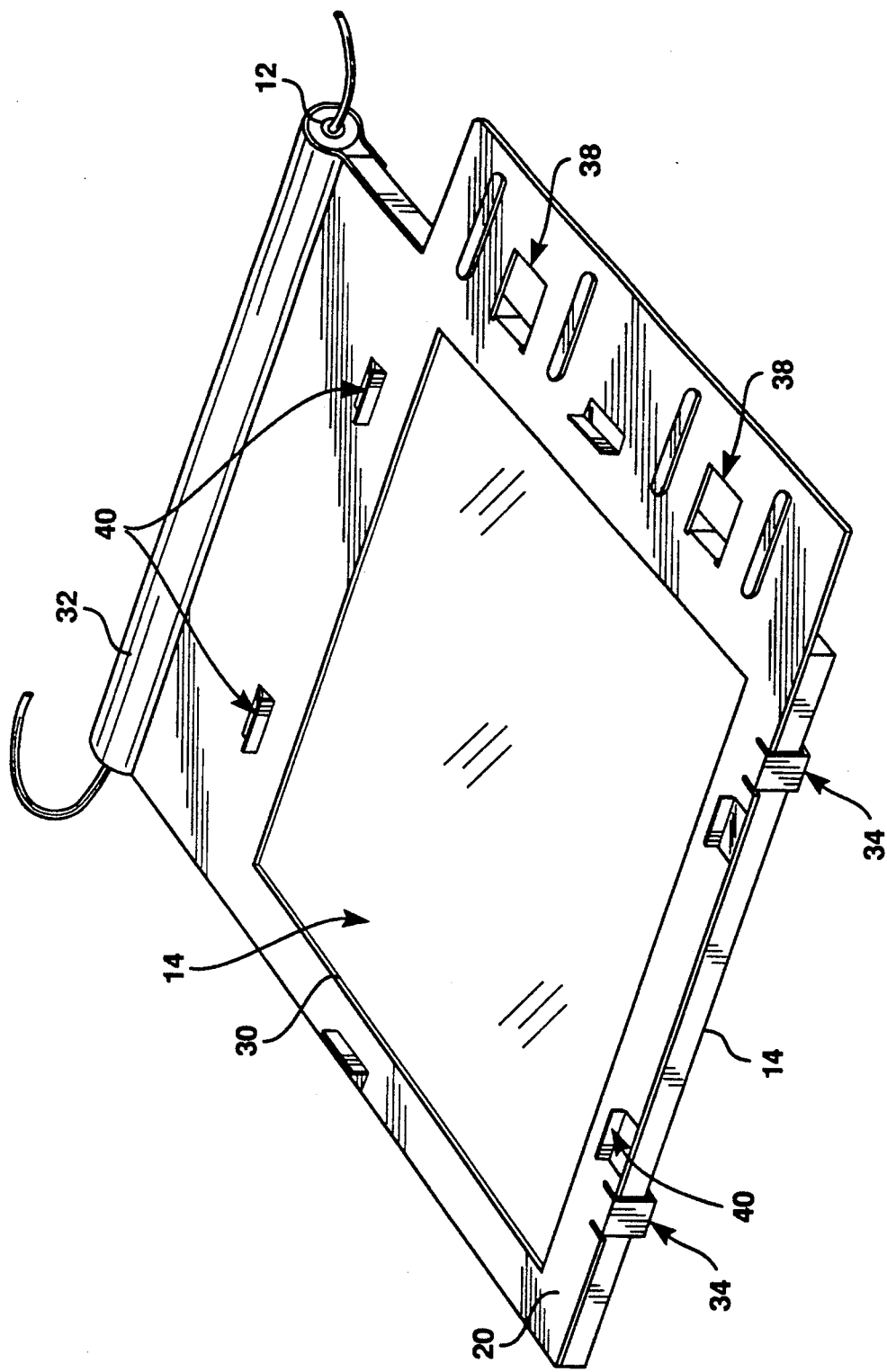
FIG. 3 shows a perspective view of an assembly in accordance with this invention with the LCD and circuitry elements removed to show details of internal frame 20.

FIG. 3 shows a perspective view of an assembly in accordance with this invention with the LCD and circuitry elements removed to show details of internal frame 20. Internal frame 20 is substantially rectangular, thin and flat, typically less than 1.0 mm thick, having a rectangular, central opening 30 roughly centered in and nearly as large as the frame 20, leaving the frame 20 as a rim around the central opening 30. The frame 20 can be constructed from cold roll steel, stainless steel, or other ferrous metal having a coefficient of expansion similar to that of the LCD glass.

Internal frame 20 has a central, rectangular opening 30. A light guide 14 is mounted below the opening 30. One method of loosely holding the light guide 14 below the opening 30 is to cradle the light guide 14 in folded-down tabs 34 extending down from internal frame 20. Light guide 14 is positioned below the opening 30 so that light from light guide 14 will travel up through opening 30 to reach the LCD 10 to be mounted on frame 20 above the opening 30. Upward-directed tabs 40 can be formed on frame 20 to assist in positioning LCD 10 onto frame 20.

To one side of frame 20 can be formed or attached a light bulb holder 32. The light bulb holder holder 32 holds a light bulb 12 positioned at the side of light guide 14 for introducing light into light guide 14.

To another side of the internal frame 20 are mounting areas 38 provided as an extension to one side of frame 20 so that circuitry 18 associated with LCD 10 can be mounted adjacent and coupled to LCD 10. These mounting areas 38 can be flat planar areas for directly mounting components, or can be cut-out areas into which a circuitry board 19 can be positioned. The circuitry 18 can be mounted on a circuitry board 19 affixed to a mounting area 38 by a gasket 22. Circuitry 18 can be directly coupled to LCD 10 by an interconnect 17.

Referring again to FIG. 2, the LCD 10 is of substantially rectangular and flat proportions, typically less than 2.0 mm thick, having an active display region of a size smaller than the central opening 30 in internal frame 20. Light traveling upward from light guide 14 passes through central opening 30 in internal frame 20 to enter the back side of LCD 10. Light selectivity travels through LCD 10 and exits the top surface of LCD 10 to travel to the viewer. LCD 10 can be affixed to internal frame 20 by adhesive backed gaskets 22 of neoprene or mylar film. Since the coefficients of thermal expansion of glass and steel are similar, the LCD and internal frame can be fixably joined without causing undue stress with changes in temperature.

The light guide 14 is substantially flat and rectangular, typically 2 to 4 mm thick, and somewhat larger than central opening 30 in internal frame 20. Because it expands more than internal frame 20 steel or LCD 10 glass, it is preferred to loosely retain the light guide 14 against internal frame 20, for example by suspending the light guide 14 within fold-over tabs 34 or by guides or brackets loosely holding the light guide 14 within the space beneath the central opening 30. In this way, light guide 14 can expand and contract by slight movement within its tabs or guides.

The light bulb 12 for introducing light into the light guide 14 can be a conventional CCF light. In the preferred embodiment shown in FIG. 3, the light bulb is mounted within a light bulb holder 32 attached to one side of internal frame 20. When both the light bulb holder 32 and light guide 14 are mounted to internal frame 20, they are aligned to transfer light from the light bulb 12 into the light guide 14.

The circuitry 18 associated with the LCD 10, usually consists of integrated circuit components, a circuitry board 19 of fiberglass or glass epoxy, and an interconnect 17 of copper traces on polyimid. Preferably, as shown in FIG. 2, the interconnect 17 can directly connect from LCD 10 to circuitry 18. Typically, the components of circuitry 18 are mounted to circuitry board 19 via surface mount or tape-automated bonding methods. A simple and lightweight adhesive gasket 22 can be used to mount the circuit board to the internal frame 20 or LCD 10. Because the LCD 10 glass and internal frame 20 steel will expand similarly, very little stress is placed on the interconnect 17 and gasket 22 during expansion or contraction with temperature.

Figure 1:
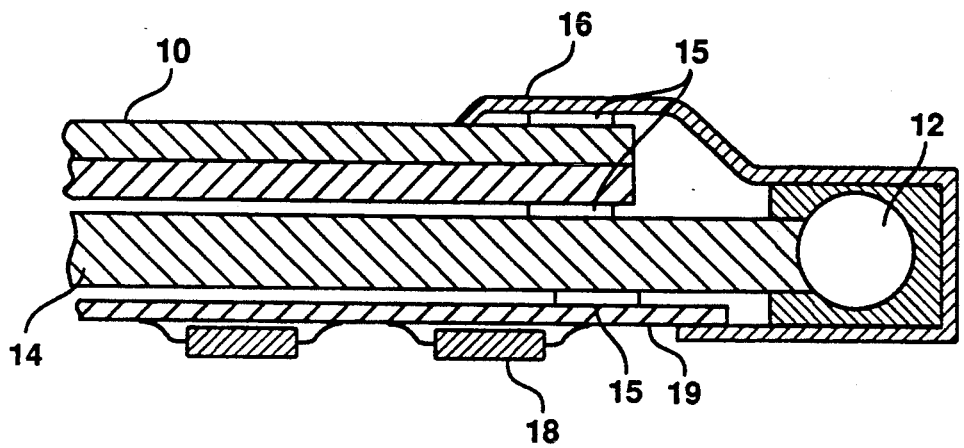
FIG. 1 shows a cross section view of a conventional assembly of a LCD, light guide and circuitry.

It should be noted that an advantage of this assembly is that the elimination of the "wrap-around" metal frame 16 of FIG. 1. When a pen or stylus sensing sheet or plate is used, it can be applied in direct contact with the upper face of the LCD 10 since there is no metal frame 16 to limit the placement of the sheet.

Other embodiments and variations of the invention will be apparent to one skilled in the art from a consideration of the specification drawings, and claims. It is intended that the scope of the invention be limited only by the scope of the following claims.

We claim:

1. A liquid crystal display, light guide and circuitry assembly comprising:

an internal frame with a central opening above which is mounted a display and below which is loosely mounted a light guide for directing light through said opening into said display;

said display having a top side and a bottom side, said display mounted to said internal frame with mounting means located between said display bottom side and said internal frame, with no portion of said internal frame extending onto said display top side;

a light bulb mounted to one side of said light guide, and positioned for introducing light into said light guide; and circuitry mounted to one side of said frame and coupled to said display.

2. An assembly as in claim 1 wherein said frame is composed of ferrous metal having a coefficient of thermal expansion similar to glass.

3. An assembly as in claim 1 wherein said mounting means located between said display bottom side and said internal frame is an adhesive gasket.

4. An assembly as in claim 1 wherein said mounting of said light guide to said frame is by a loose restraining system which allows expansion of said light guide separate of said frame.

5. An assembly as in claim 4 wherein said loose restraining system is tabs on said frame projecting downward along the sides of said light guide and then bent inward toward said central opening along a bottom surface of said light guide.

6. A liquid crystal display, light guide and circuitry assembly comprising:

a substantially rectangular, thin and flat internal frame, having a rectangular central opening substantially centered in and nearly as large as said frame but said opening remaining surrounded by a rim of said frame;

said display having substantially rectangular and flat proportions and having an active display region of a size smaller than said opening, said display having a top side for viewing and a bottom side for receiving light, said display mounted on top of said frame by a mounting means located between said display bottom side and said frame, with no portion of said frame extending onto said display top surface, such that said opening aligns around said active display region on the bottom side of said display;

said light guide having a substantially flat and rectangular area larger than said opening, said light guide loosely mounted below said opening for directing light upward through said opening to reach said bottom side of said display;

a light bulb mounted to one side of said light guide, and positioned for introducing light into said light guide; and circuitry mounted on a circuitry board mounted to said frame to the side of said opening and coupled to said display for attaching said circuitry to said display.

7. An assembly as in claim 6 wherein said frame is composed of ferrous metal having a coefficient of thermal expansion similar to glass.

8. An assembly as in claim 6 wherein said mounting means located between said display bottom side and said frame is an adhesive gasket.

9. An assembly as in claim 6 wherein said mounting of said light guide to said frame is by a loose restraining system which allows expansion of said light guide separate of said frame.

10. An assembly as in claim 9 wherein said loose restraining system is tabs on said frame projecting downward along the sides of said light guide and then bent inward toward said central opening along a bottom surface of said light guide.

11. A liquid crystal display, light guide and circuitry assembly comprising:

a internal frame composed of ferrous metal formed in a substantially flat, rectangular sheet having a large, substantially rectangular, central opening;

said liquid crystal display having external surfaces composed of glass, said display having a top side and a bottom side and being mounted to a top surface of said frame by an adhesive gasket located between said display bottom side and said top surface of said frame, with no portion of said internal frame extending onto said display top side, and said display mounted to position an active viewing area of said display over said opening in said frame;

said light guide composed of light diffusing material, and having a substantially flat top surface larger than said opening in said frame, said light guide loosely held in place below said frame to position said flat top surface against said opening in said frame, said light guide held in position by restraining tabs on said frame reaching downward and around outer edges of said light guide; and circuitry coupled to said display and mounted on said frame adjacent to said display.

* * * * *